United States Patent [19]
Navarro

[11] 3,809,053
[45] May 7, 1974

[54] ROASTING DEVICE

[76] Inventor: Jorge Roca Navarro, Lauria St. 123, Barcelona, Spain

[22] Filed: Sept. 25, 1972

[21] Appl. No.: 291,556

[30] Foreign Application Priority Data
June 26, 1972 Spain .................................. 181929

[52] U.S. Cl. .............. 126/25 R, 99/421 H, 126/9 R
[51] Int. Cl. ............................................ A47j 37/07
[58] Field of Search... 99/339, 340, 421 H, 421 HH, 99/421 R, 421 A; 126/25 R

[56] References Cited
UNITED STATES PATENTS

| | | | |
|---|---|---|---|
| 2,512,223 | 6/1950 | Contiguglia .......................... | 99/339 |
| 2,680,436 | 6/1954 | Derden ............................ | 126/25 R |
| 2,718,845 | 9/1955 | Dudley ........................ | 126/25 A X |
| 3,230,948 | 1/1955 | Schmitt ............................ | 126/25 R |

FOREIGN PATENTS OR APPLICATIONS

| | | | |
|---|---|---|---|
| 1,447,294 | 6/1966 | France .......................... | 99/421 HH |
| 1,289,118 | 3/1961 | France .................... | 99/340 |

Primary Examiner—Carroll B. Dority, Jr.
Assistant Examiner—Harold Joyce
Attorney, Agent, or Firm—Woodhams, Blanchard and Flynn

[57] ABSTRACT

An improved roaster of the type comprising a cooking chamber formed by a rectangular body provided with a broad base wall and an end wall and two parallel side walls at 90°, in one of which there is an open slot terminating in circular supporting surfaces in order to serve as a bearing for the neck of a split that is disposed transversally to said chamber, said spit provided on one extremity with a handle and on the opposite extremity with an end portion connectible to and rotatably driven by an electric motor situated outside a cooking chamber and fixed at the side of same, wherein the body has a transversal partition of small height, extending upwardly from the base wall and spaced from the end wall to form a compartment therebetween for holding combustible material, a bottom grate seated on flanges of the side walls of the chamber and limited by said transversal partition, said bottom grate forming the bottom wall of the compartment, said bottom grate being spaced upwardly from said base wall and forming an ash collection chamber therebetween, a vertical grate situated in vertical guides on the side walls of the chamber and forming the front side of the compartment.

4 Claims, 4 Drawing Figures

ROASTING DEVICE

This invention refers to an improved roasting grate and more concretely to a roasting grate that permits the double function of "grate" (now better known as "barbecue") and "roaster," which by means of a single source of heat (wood, vegetable carbon, etc.) permits the simultaneous function of "grate" at its upper horizontal part, with that of the "roaster" at its frontal and vertical part, thus permitting simultaneously as already stated the perfect positioning of the aliments that have to be cooked. The invention also permits by means of the simple addition of an upper piece as a windscreen, and a complementary grate, their conjoint amplification, thus securing a greater volume and duration of the heating element which functions as a roasting grate.

The invention also permits the mobile grates to be situated in such a manner that the total combustible container space may be reduced at will with the accompanying saving of the combustible material. When the device is required only for its "grate" function, or for roasting only, then the aliments to be roasted are situated in front of the heating source, or are suspended in such a manner to allow their correct rotary movement in front of the heating source.

Finally it is also provided in view of the design and size of the mobile grates, that in their vertical position, they allow the coupling of a screen with a heating source by infrared rays, either electric or butane, etc. which implies that the apparatus itself may be served by these other heating systems to comply with the function, grid or toaster or roaster indistinctly, said screen's situation being at greater or less height with relation to the base as found convenient.

In the drawings:

FIG. 1 shows a perspective of the components of the roasting grate assembly.

FIG. 2 corresponds to a sectional elevational view of the device in its most simplified position relating to grate and roaster.

Figure 1:
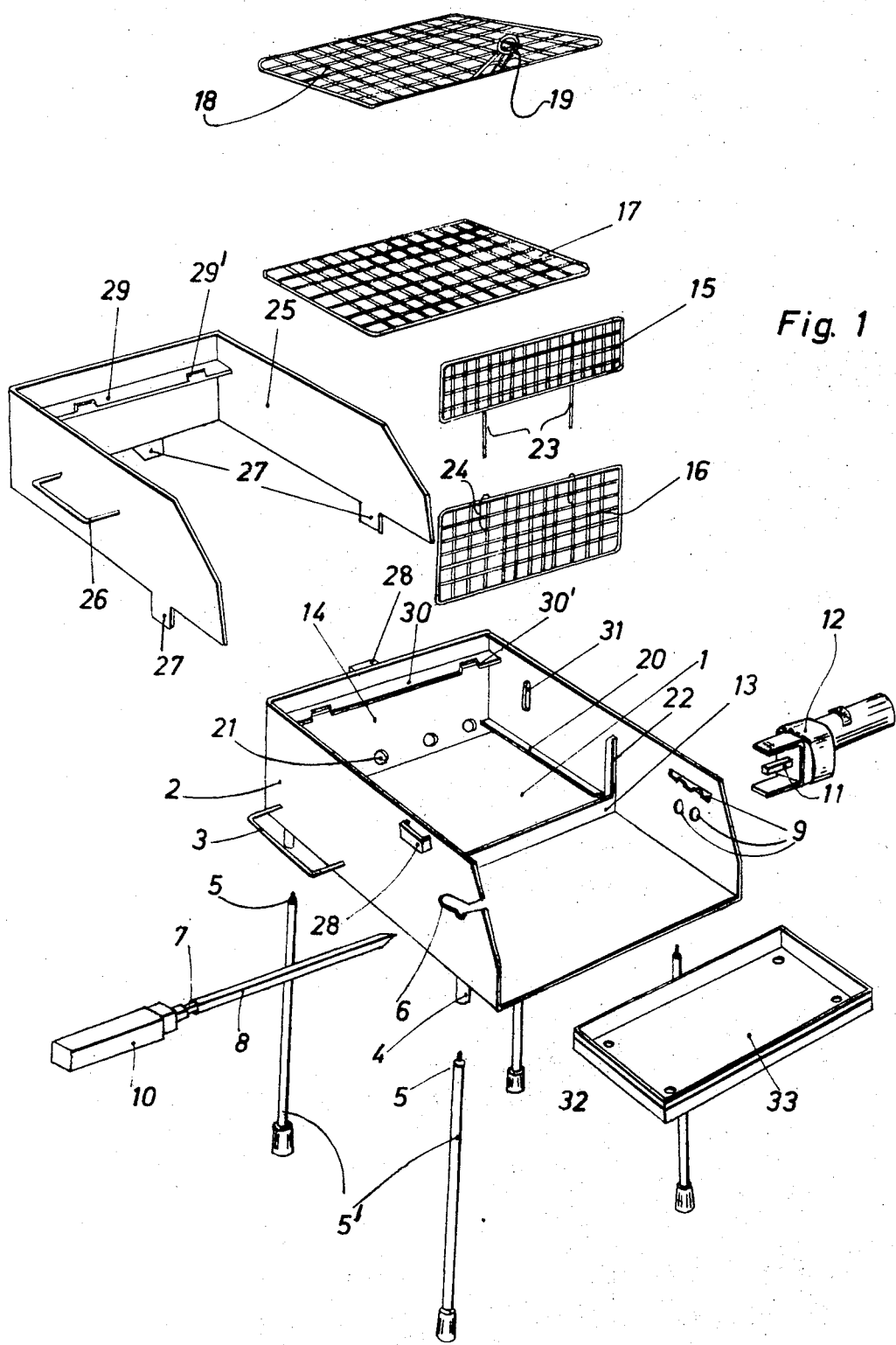

Referring to the drawings, there is illustrated a roasting grate having a parallelepiped straight rectangular housing or body 1, open at its upper and front sides, which body forms a cooking chamber. Handles 3 are provided on the outer faces of the housing sides 2. The bottom wall of body 1 has threaded sleeves 4 thereon which receive the threaded terminals 5 of the removable legs 5'.

An open oblique slot 6 on one of the sides 2 has two circular surfaces 6' that acts as bearing supports for the neck 7 of the spike or spit 8. The surfaces 6' in conjunction with the orifices 9 on the opposite side 2 allow the spit 8 to be disposed in several working positions relative to the vertical grate 16. The spit 8 is provided with a handle 10 of insulating material situated outside of the chamber. The spit 8 is square and ends with a pyramidal point that is inserted axially into the square tubular shaft 11 that rotates, same being driven by an electric motor 12 which may be fed by or from existing network, by drycells or any other form of energy supply.

The base wall of the body 1 has a dividing partition 13 of small height fixed thereto. A compartment for the combustible material is formed between said partition 13 and the end wall 14. Said compartment is formed by a plurality of grates or perforated plates which combine to form a receptacle for holding the firewood or live coals. This receptacle is comprised by grates or plates 15, 16, 17 and 18.

The plate 18 functions only as a grate and is provided with a handle 19.

Figure 2:
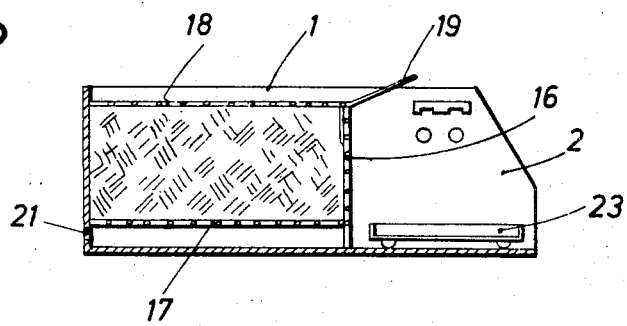
Figure 4:
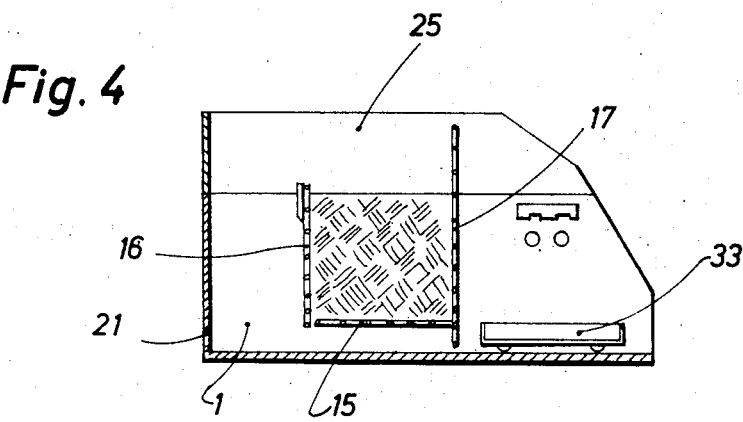
FIG. 4 is a view similar to FIG. 3 in which the device functions as a roaster of aliments suspended in front of the vertical radiant surface, the function of grate having been eliminated, whereby the volume of the combustible container has been reduced in order to economize on said combustible material.

The grate 17 may function as a horizontal base, as shown in FIG. 2, which rests on the flanges 20, thereby forming between said grate 17 and the base wall of the body 1 an ash collector chamber provided with orifices 21 as an air passage. Grate 17 may also function as a vertical front, as represented in FIG. 4, same being slidably positioned between the vertical guides 22.

Figure 3:
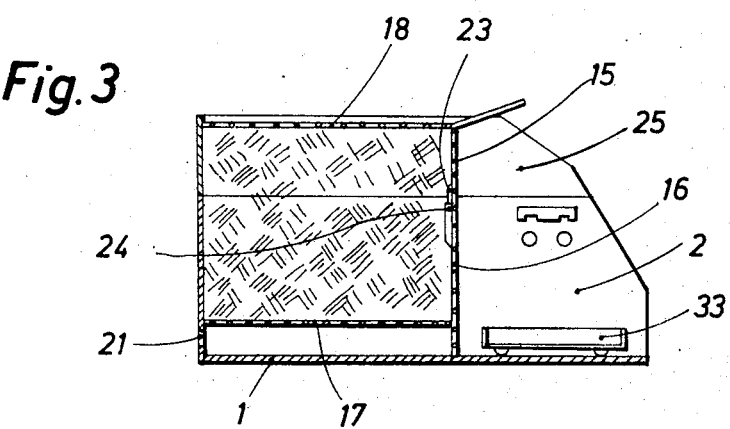
FIG. 3 is a view similar to FIG. 2 but wherein an upper complementary piece has been added as a windscreen, and wherein a piece of complementary grate has been added to increase the volume for combustible material thereby obtaining a larger vertical radiating surface for the roasting of aliments suspended and situated in front of the vertical surface.

The grates 15 and 16 coact to form a vertical front as shown in FIG. 3, for which the grate 15 is provided with spikes 23 that are inserted in the sockets 24 of the grate 16. However, grate 16 may be used independently as shown in FIGS. 2 and 4. Effectively, in FIG. 2, the grate 16 constitutes the vertical sustaining front of the combustible department and is supported by the guides 22. In FIG. 4, the grate 16 forms the vertical sustaining back of the combustion compartment which is of reduced size, while the grate 15 is supported by flanges 20 and constitutes the bottom of said compartment.

To increase the capacity of body 1, a U-shaped windscreen 25 may be added thereto. The windscreen 25 is provided with handles 26 and 27 that are inserted in loops 28 formed on the sidewalls of the body 1. The wind screen 25 is preferably slightly wider than the housing or body 1 to enable same to encase the body to reduce the total volume of the overall device to simplify transport or storage of same.

The windscreen 25 has a flange 29 similar to the flange 30 formed on the body 1, both serving as a support of the horizontal grate 18 and both provided with upwardly projecting teeth 29' and 30' respectively which prevent slipping of the grate 18.

The channel-like vertical guides 31 as secured to the sides 2 receive the edges of the rear grate 16 when same is positioned as in FIG. 4.

Between the dividing partition 13 and the free border of the body 1, there is provided a space 32 for positioning a juice collector tray 33.

The embodiments of the invention in which an exclusive property or privilege is claimed are defined as follows:

1. An improved roaster of the type comprising a cooking chamber formed by a body provided with a broad base wall and an end wall and two parallel side walls at 90 degrees, in one of which there is an open slot terminating in a circular supporting surface in order to serve as a bearing for the neck of a spit that is disposed transversely to said chamber, said spit provided on one extremity with a handle and on the opposite extremity with an end portion connectible to and rotatably driven by an electric motor situated outside the cooking chamber and fixed at the side of same, wherein the body has a transversal partition of small height, extending upwardly from the base wall and spaced from the end wall to form a compartment therebetween for holding combustible material, a bottom grate seated on flanges of the side walls of the chamber and limited by said transversal partition, said bottom grate forming the bottom wall of the compartment, said bottom grate being spaced upwardly from said base wall and forming an ash collection chamber therebetween, a vertical grate situated in vertical guides on the side walls of the chamber and forming the front side of the compartment, a horizontal grate forming the upperside of said compartment and extending between said vertical grate and said end wall, and a U-shaped wind screen removably mounted on the body adjacent the upper edge thereof, said U-shaped wind screen including an end wall and two parallel side walls extending outwardly from the end wall at approximately 90°, the end wall and the side walls of the wind screen being positioned to approximately comprise upward extensions of the respective end wall and sidewalls of said body, said wind screen and said body having means coacting therebetween for permitting said wind screen to be mounted on but readily removed from said body.

2. A roaster according to claim 1, wherein the U-shaped wind screen has a width which is slightly different from the width of said body to permit the wind screen, when dismounted from the body, to be positioned in substantially telescopic relationship with the body to reduce the total volume of the roaster to simplify storage and transporting thereof.

3. A roaster according to claim 1, further including an auxiliary grate mounted above the vertical grate and extending substantially the full height of the wind screen, said auxiliary grate constituting a support for one edge of said horizontal grate, and said wind screen having means thereon for supporting a further edge of said horizontal grate.

4. A roaster according to claim 3, wherein the sidewalls of the body have further vertical guides associated therewith, said further vertical guides being disposed between said first-mentioned vertical guides and said end wall of said body, whereby said grates may be rearranged such that said bottom grate is positionable within said first-mentioned vertical guides to form the front wall of the compartment, said vertical grate is positioned within said further vertical guides for forming the backwall of said chamber, and said auxiliary grate is positionable on the flanges on the side walls to form a bottom wall of the chamber, whereby positioning of the grates in this manner decreases the capacity of the compartment.

* * * * *